United States Patent [19]

Jacobs

[11] Patent Number: 6,097,939
[45] Date of Patent: Aug. 1, 2000

[54] METHOD AND APPARATUS FOR EVENT DATA MAINTENANCE PER MIN/ESN PAIR IN A MOBILE TELEPHONE SYSTEM

[75] Inventor: Pamela J. Jacobs, Omaha, Nebr.

[73] Assignee: Compaq Computer Corporation, Houston, Tex.

[21] Appl. No.: 08/891,556

[22] Filed: Jul. 11, 1997

[51] Int. Cl.[7] .............................. H04M 1/66; H04M 3/16; H04K 1/00
[52] U.S. Cl. .............................. 455/410; 455/411; 380/23
[58] Field of Search ................................. 455/423, 424, 455/425, 410, 411, 406, 408, 422, 432, 433, 435, 517; 380/23, 25

[56] References Cited

U.S. PATENT DOCUMENTS

| | | | |
|---|---|---|---|
| 4,799,061 | 1/1989 | Abraham et al. | 340/825.34 |
| 4,930,150 | 5/1990 | Katz | 379/93 |
| 5,014,298 | 5/1991 | Katz | 379/93 |
| 5,048,075 | 9/1991 | Katz | 379/92 |
| 5,077,790 | 12/1991 | D'Amico et al. | 455/435 |
| 5,091,942 | 2/1992 | Dent | 455/411 |
| 5,128,984 | 7/1992 | Katz | 379/92 |
| 5,153,902 | 10/1992 | Buhl et al. | 379/57 |
| 5,204,902 | 4/1993 | Reeds, III et al. | 380/23 |
| 5,210,787 | 5/1993 | Hayes et al. | 379/60 |
| 5,237,612 | 8/1993 | Raith | 455/411 |
| 5,243,645 | 9/1993 | Bissell et al. | 379/211 |
| 5,282,250 | 1/1994 | Dent et al. | 455/411 |
| 5,309,501 | 5/1994 | Kozik et al. | 455/410 |
| 5,329,578 | 7/1994 | Brennan et al. | 379/67 |
| 5,371,781 | 12/1994 | Ardon | 379/59 |
| 5,406,619 | 4/1995 | Akhteruzzaman et al. | 379/93.02 |
| 5,418,835 | 5/1995 | Frohman et al. | 379/57 |
| 5,448,622 | 9/1995 | Huttunen | 379/58 |
| 5,448,760 | 9/1995 | Frederick | 455/425 |
| 5,455,863 | 10/1995 | Brown et al. | 380/23 |
| 5,504,804 | 4/1996 | Widmark et al. | 379/63 |
| 5,513,245 | 4/1996 | Mizikovsky et al. | 455/411 |
| 5,530,736 | 6/1996 | Comer et al. | 379/58 |
| 5,533,107 | 7/1996 | Irwin et al. | 379/201 |
| 5,551,073 | 8/1996 | Sammarco | 455/411 |
| 5,553,120 | 9/1996 | Katz | 379/88 |

(List continued on next page.)

FOREIGN PATENT DOCUMENTS

| | | | |
|---|---|---|---|
| 0 738 095 A2 | 10/1996 | European Pat. Off. | H04Q 7/38 |
| WO 93/11646 | 6/1993 | WIPO | H04Q 7/04 |
| WO 93/21715 | 10/1993 | WIPO | H04L 12/56 |
| WO 94/29992 | 12/1994 | WIPO | H04M 3/38 |
| WO 98/05173 | 2/1998 | WIPO | H04Q 7/22 |

OTHER PUBLICATIONS

Holley, K. A.; Global system for mobile communications–what's in store?; BT Technol; vol. 14; Jul. 1996; pp. 47–53.

Wey J–K et al; Clone Terminator: An Authentication Service for Advanced Mobile Phone System; Jul. 25, 1995; IEEE; pp. 175–179.

Find Me NOw™ Service User Guide; Apr. 1994; pp. 1–8.

Eleftheriadis, G. P. et al.; User Profile Identification in Future Mobile Telecommunications Systems; IEEE Network; Sep./Oct. 1994; pp. 33–39.

Rydin, L. et al.; Network and Service Evolution in Fixed and Mobile Networks; ISS; Oct. 1992; vol. 1; pp. 54–57.

Kaczmarek, K. W.; Cellular Networking: A Carrier's Perspective; IEEE; 1989; pp. 1–6.

*Primary Examiner*—Reinhard J. Eisenzopf
*Assistant Examiner*—Charles N. Appiah
*Attorney, Agent, or Firm*—Fenwick & West LLP

[57] ABSTRACT

A method and apparatus for allowing an Authentication Center (AC) in a cellular telephone system to store and access event a predefined number of maintenance data events on a per-MIN/ESN basis.

7 Claims, 16 Drawing Sheets

Adding data to a subscriber record

U.S. PATENT DOCUMENTS

| Patent No. | Date | Inventor | Class |
|---|---|---|---|
| 5,590,175 | 12/1996 | Gallant et al. | 379/58 |
| 5,594,740 | 1/1997 | LaDue | 455/410 |
| 5,600,704 | 2/1997 | Ahlberg et al. | 379/58 |
| 5,603,081 | 2/1997 | Raith et al. | 455/433 |
| 5,615,267 | 3/1997 | Lin et al. | 455/411 |
| 5,642,401 | 6/1997 | Yahagi | 455/411 |
| 5,668,875 | 9/1997 | Brown et al. | 455/411 |
| 5,673,308 | 9/1997 | Akhavan | 379/61 |
| 5,708,710 | 1/1998 | Duda | 380/21 |
| 5,719,918 | 2/1998 | Serbetciouglu et al. | 379/58 |
| 5,724,417 | 3/1998 | Bartholomew et al. | 379/211 |
| 5,737,701 | 4/1998 | Rosenthal et al. | 455/411 |
| 5,754,952 | 5/1998 | Hodges et al. | 455/411 |
| 5,754,955 | 5/1998 | Ekbatani | 455/422 |
| 5,761,500 | 4/1996 | Gallant et al. | 707/10 |
| 5,768,358 | 6/1998 | Venier et al. | 379/207 |
| 5,793,859 | 8/1998 | Matthews | 379/220 |
| 5,794,139 | 8/1998 | Mitzikovsky et al. | 455/403 |
| 5,822,691 | 10/1998 | Hosseini | 455/410 |
| 5,875,394 | 2/1999 | Daly et al. | 455/411 |
| 5,878,126 | 3/1999 | Velamuri et al. | 379/219 |
| 5,887,251 | 3/1999 | Fehnel | 455/411 |
| 5,937,068 | 8/1999 | Audebert | 380/23 |
| 5,943,425 | 8/1999 | Mizikovsky | 380/25 |
| 5,974,252 | 2/2000 | Lin et al. | 395/701 |
| 6,026,293 | 2/2000 | Osborn | 455/411 |

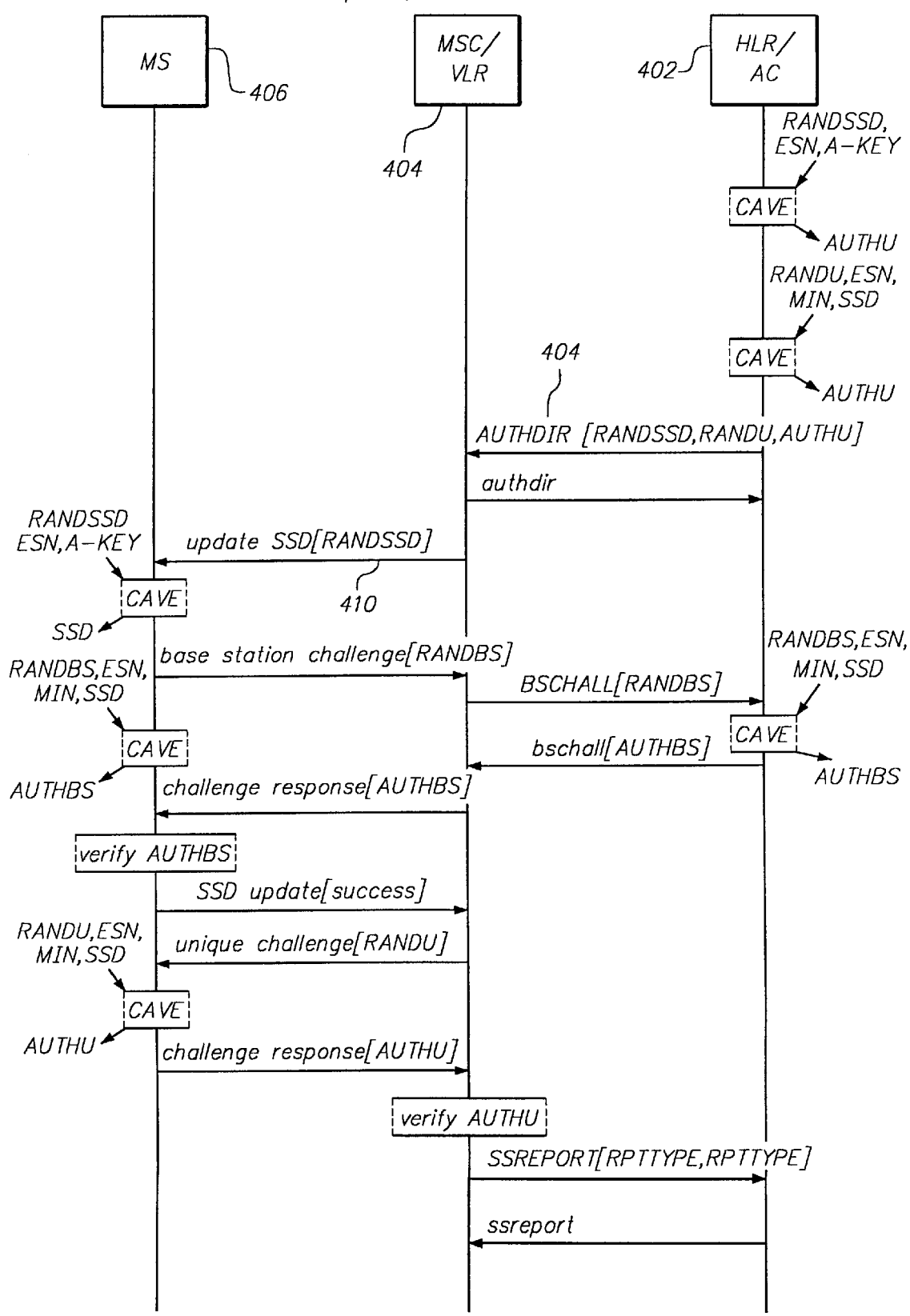

AC Subsystems

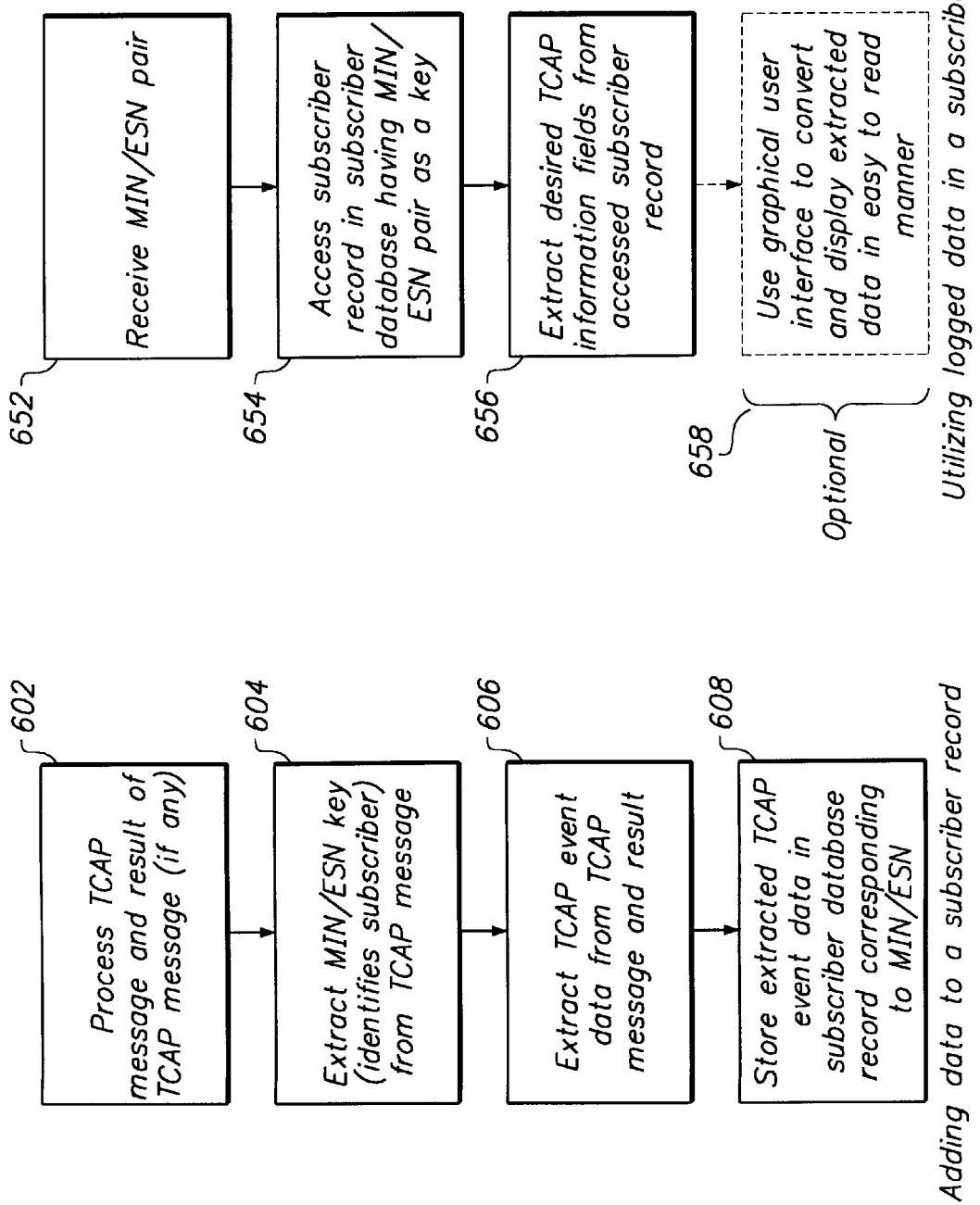

FIG. 7A-1

| Authentication Request INVOKE Message | | |
|---|---|---|
| Parameter | R/C | Description & Usage |
| 702 — Mobile Identification Number (MIN) | R | Contains the MIN of the subscriber. Used as a key to the AC Subscriber Profile file (SUBA). |
| Equipment Serial Number (ESN) | R | Contains the Equipment Serial Number of the subscriber. Used for validation by comparison with ESN in the SUBA file. |
| 703 — System Capabilities (SYSCAP Serving) | R | Defines the authentication capabilities of serving system. |
| 704 — System Access Type (SYSACCTYPE) | R | Identifies the type of system access made by the MS. |
| 706 — MSCID (Serving MSC or VLR) | R | Contains the MSCID of the serving MSC/VLR. |
| Authentication Data | C | Contains the 24-bit authentication data used as input to CAVE for call origination. This parameter is derived from the information sent by the MS to the MSC/VLR. |
| Authentication Response (AUTHR) | C | Contains the response generated by an MS when accessing the system for call origination, page response, or autonomous registration. It is computed by CAVE using the SSD of the MS and a Random Number (RAND) chosen by the MS. |

| | | |
|---|---|---|
| Call History Count (COUNT) | C | Contains a modulo-64 event counter maintained by the MS, the AC, and optionally, the VLR. It is used for clone detection. The events that result in the counter being incremented are defined by the AC and, optionally, the VLR. They may include initial registration in a new serving MSC, call origination, page response, or expiration of a timer. |
| Confidentiality Modes (Actual) | C | Not used by this release of AC. |
| Digits (Dialed) | C | Contains dialed digits for input to the CAVE algorithm if SYSACCTYPE is Call Origination. |
| PC_SSN (Serving MSC or VLR) | C | Contains the Point Code and SSN of the serving MSC/VLR. |
| Random Variable (RAND) | C | Contains a random number that is used as input to the CAVE algorithm for authentication. The random number is chosen by the serving system (MSC or VLR) independently of the AC. |
| Sender Identification Number | C | Not used by this release of AC. |
| Terminal Type | C | Identifies the radio frequency interface standard supported by the associated MS. |

708

*FIG. 7A  FIG. 7A-2  Authentication Request (Authrqst) Message (to AC)*

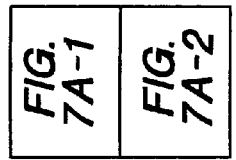

The following table illustrates the needed parameter combinations for each system access type, i.e. registration, call origination, call termination, etc. in an auth.

| SYSACCTYPE | PARAMETERS |
|---|---|
| Unspecified or Reserved | MIN, ESN, SYSCAP, SYSACCTYPE, MSCID |
| Flash Request | MIN, ESN, SYSCAP, SYSACCTYPE, MSCID |
| Registration | MIN, ESN, SYSCAP, SYSACCTYPE, MSCID, RAND, and AUTHR |
| Call Origination | MIN, ESN, SYSCAP, SYSACCTYPE, MSCID, RAND, AUTHR, and (Dialed Digits or Authentication Data) |
| Page Response | MIN, ESN, SYSCAP, SYSACCTYPE, MSCID, RAND, and AUTHR |
| Not Used or No Access | MIN, ESN, SYSCAP, SYSACCTYPE, MSCID |

*FIG. 7B*

As a result of the authentication attempt, the AC may direct the MSC/VLR to perform an SSD Update, or a Unique Challenge. The AC will also indicate to the MSC/VLR if service should be denied by including the DENACC parameter. The following table illustrates the valid parameter combinations for each of the authentication events contained in the Authentication Request RETURN RESULT message.

| Authentication Event | MSC/VLR shares SSD | MSC/VLR does not share SSD |
|---|---|---|
| SSD Update | RANDSSD, and SSD | AUTHU, RANDSSD, RANDU, and NOSSD |
| Unique Challenge | RANDU, AUTHU, and SSD | RANDU, AUTHU and NOSSD |

*FIG. 8B*

| Authentication Request RETURN RESULT Message | | |
|---|---|---|
| Parameter | R/C | Description & Usage |
| Authentication Algorithm Version | C | Not used by the current release of AC. |
| Authentication Response Unique Challenge (AUTHU) | C | Contains the response to a Unique Challenge Order. It is computed by CAVE using the SSD of the MS and a Random Number (RANDU). |
| Call History Count (COUNT) | C | Not used by this release of AC. |
| CDMA Private Long Code Mask | C | Not used by the current release of AC. |
| Deny Access (DENACC) | C | Indicates a Deny Access response and the reason the MS has failed authentication. |
| Random Variable SSD (RANDSSD) | C | Contains a 56-bit random number that is used as input to the CAVE algorithm for generating Shared Secret Data (SSD). The random number is chosen by the AC when an SSD update is to be initiated. |
| Random Variable Unique Challenge (RANDU) | C | Contains a 32-bit random number that is used as input to the CAVE algorithm for authenticating a specific Mobile Station (MS). The random number is chosen by the AC when a unique challenge is to be initiated. |
| Shared Secret Data (SSD) | C | Contains the SSD used in authentication of a MS. The SSD is computed only at the AC and at the MS since it is based on the A-Key which is shared only between the AC and the MS. |
| Signaling Message Encryption Key | C | Not used by this release of AC. |
| Terminal Type (TERMTYP) | C | Identifies the radio frequency interface standard supported by the MS. The values of this parameter are derived from the IS-54 Mobile Protocol Capability indicator (MPCI). |
| SSD Not Shared (NOSSD) | C | Indicates the previously provided SSD is no longer valid. |
| Update Count (UPDCOUNT) | C | Indicates the Call History Count in the MS. and optionally the MSC/VLR, should be incremented. |
| Voice Privacy Mask | C | Not used by this release of AC. |

*FIG. 8A*  Authentication Request RETURN RESULT Message (from AC)

| Parameter | R/C | Description & Usage |
|---|---|---|
| Mobile Identification Number (MIN) | R | Contains the MIN of the subscriber. Used as a key to the AC Subscriber Profile file (SUBA). |
| Equipment Serial Number (ESN) | R | Contains Equipment Serial Number of the subscriber. Used for validation by comparison with ESN in the SUBA file. |
| Authentication Algorithm Version | C | Not used by the current release of AC. |
| Authentication Response Unique Challenge (AUTHU) | C | Contains the 18-bit response to a Unique Challenge Order. It is computed from the CAVE algorithm using the SSD of the MS and RANDU. |
| Call History Count (COUNT) | C | Not used by the current release of AC. |
| Deny Access (DENACC) | C | Not used by the current release of AC. |
| Location Area ID | C | Not used by this release of AC. |
| Random Variable SSD (RANDSSD) | C | Contains a 56-bit random number that is used as input to the CAVE algorithm for generating Shared Secret Data (SSD). The random number is chosen by the AC when an SSD update is to be initiated. |
| Random Variable Unique Challenge (RANDU) | C | Contains a 32-bit random number that is used as input to the CAVE algorithm for authenticating a specific Mobile Station (MS). The random number is chosen by the AC when a unique challenge is to be initiated. |
| Sender identification Number | C | Not used by the current AC release. |
| Shared Secret Data (SSD) | C | The SSD in not included in the invoke since the Authentication Directive is routed to the HLR and the HLR is responsible for routing the Authentication Directive based on the most recent MS location data. Because the AC does not have the location data stored in the HLR, it cannot determine if SSD is shared. Therefore, to avoid sending SSD to a MSC/VLR that is not supposed to share SSD, SSD is not included in the Authentication Directive. |
| SSD Not Shared (NOSSD) | C | Indicates the previously provided SSD is no longer valid. |
| Update Count (UPDCOUNT) | C | Not used by the current release of AC. |

Authentication Directive (Authdir) Message

FIG. 9A

The following table illustrates the valid parameter combinations for each of the authentication events in an authdir message.

| Authentication Event | Invoke Message Contents |
|---|---|
| Immediate Manual SSD Update | MIN,ESN,RANDSSD,RANDU, AUTHU, AND NOSSD |
| Manual Unique Challenge | MIN,ESN,RANDU, and AUTHU |
| Subscriber MS ESN Change | MIN,ESN, and NOSSD |
| Subscriber Authentication Deactivation | MIN,ESN, and NOSSD |

*FIG. 9B*

Authentication Directive RETURN RESULT Message

The Authentication Directive RETURN RESULT Message is sent from the MSC/VLR to acknowledge the receipt of the Authentication Directive INVOKE.

| Authentication Directive RETURN RESULT Message | | |
|---|---|---|
| Parameter | R/C | Description & Usage |
| Call History Count (COUNT) | C | Constains a modulo-64 event counter maintained by the MS, the AC, and, optionally, the VLR. It is used for clone detection. The events that result in the counter being incremented are defined by the AC and, optionally, the VLR. They may include initial registration in a new serving MSC, call origination, page response, or expiration of a timer. |

*FIG. 10*

*Subscriber Database Record*

METHOD AND APPARATUS FOR EVENT DATA MAINTENANCE PER MIN/ESN PAIR IN A MOBILE TELEPHONE SYSTEM

RELATED APPLICATIONS SECTION

The following applications are related to the subject application. Each of the following applications is incorporated by reference herein.

1. U.S. application Ser. No. 08/781,262 entitled "Method and Apparatus for Providing Switch Capability Mediation in a Mobile Telephone System," of Lamb et al., filed Jan. 11, 1997;

2. U.S. application Ser. No. 08/781,264 entitled "Method and Apparatus for Providing Fraud Protection Mediation in a Mobile Telephone System," of Lamb, filed Jan. 11,1997;

3. U.S. application Ser. No. 08/781,259 entitled "Method and Apparatus for Implementing Alias Mobile ID Numbers in a Mobile Telephone System," of Lamb, filed Jan. 11,1997;

4. U.S. application Ser. No. 08/781,261 entitled "Method and Apparatus for Implementing Configurable Call Forwarding Bins in a Mobile Telephone System," of Lamb, filed Jan. 11, 1997;

5. U.S. application Ser. No. 08/781,260 entitled "Method and Apparatus for Method and Apparatus For Automated Updates on an A-Key Entry In a Mobile Telephone System," of Jacobs, filed Jan. 11,1997;

6. U.S. application Ser. No. 08/781,258 entitled "Method and Apparatus for Configuration of Authentication Center Operations Allowed by System Access Type in a Mobile Telephone System," of Jacobs, filed Jan. 11, 1997;

7. U.S. application Ser. No. 08/781,263 entitled "Method and Apparatus for Authentication Directive Initiation Limits in a Mobile Telephone System," of Jacobs, filed Jan. 11,1997.

8. U.S. application Ser. No. 08/780,830 entitled "Method and Apparatus for Configuration of Authentication Center Operations Allowed by MSCID in a Mobile Telephone System," of Jacobs et al., filed Jan. 11, 1997.

FIELD OF THE INVENTION

This application relates to a mobile telephone system and, specifically, to a method and apparatus for improved storage of information relating to a wireless communication system.

BACKGROUND OF THE INVENTION

Wireless communication is one of the fastest growing segments of the telecommunication industry. With the mobility of the wireless devices, such as cellular phones and pagers, a subscriber to a wireless service can make or receive a call, or receive a message without being restricted to any particular locations. The convenience provided by wireless devices has led to their widespread use by average consumers.

Airtime fraud is a costly problem for wireless communications providers (also called "operators"). Callers (also called "subscribers") can gain unauthorized access to cellular networks by "cloning" legitimate cellular phones (also called "handsets," "Mobile Stations," or "MSs"). The cloning process duplicates the memory contents of a legitimate cellular phone so that the clone cellular phone appears to be legitimate to the rest of the system. In certain highcrime areas, large numbers of cellular phone calls are estimated to be placed from cloned handsets. The challenge to cellular telephone companies lies in determining whether a handset communicating with the system is a legitimate handset or a clone.

In the past, operators could only detect fraudulent access after the fact. The detection process involved labor-intensive post-call analysis and did not stop cloned handsets from fraudulently obtaining service. Currently, many conventional cellular systems include one or more Authentication Center (AC) portions. When a calling person activates a handset, the AC checks the profile of the person who is registered for the handset. The AC then initiates a challenge to the handset. If the handset's response matches the AC's challenge, network access is granted. Otherwise, access is denied. The authentication process greatly reduces airtime losses and serves as a deterrent to the crime of cloning.

In many cellular phone systems, the AC performs authentication in connection with the following events: registration (when a phone roams into a new area); origination of a call; flashing (which involves, e.g., three way calling, call waiting, or paging); and call termination. In general, the MSC (Mobile Switching Center) associated with the area of the handset being authenticated sends an authentication request (AUTHRQST) message to the AC for each of these events.

To further authenticate handsets, conventional ACs periodically send "SSD update" messages and "unique challenge" messages to MSC/VLR in the system. These messages (also called "authentication messages") are defined in the ANSI IS-41 standard for cellular telephones, which is herein incorporated by reference.

Most systems include MSC/VLRs from various vendors and not all the MSC/VLRs in a system operate in the same way or are treated the same way by the AC. For example, some VLRs are allowed to access secret "SSDs" sent to them by the AC, while others are not. Some VLRs may use proprietary features and the proprietary features of various VLRs may differ from one another.

In conventional systems, an AC logs messages that it processes in a central message log database. No effort is made to classify the messages or to organize them in a way that will aid in their retrieval. Thus, retrieval of data from the database may require the analysis of many event records (days, weeks, or even months worth) to obtain the most recent transactions for a particular subscriber's Mobile Identification Unit (MIN). This process is so slow that it is not appropriate for real-time response systems, such as customer care sites or online query systems. In addition, many systems keep the logged data for only a predetermined period of time, so that the logged data needed to find several transactions for a particular MIN/ESN may not be available at some later time when it is needed.

In conventional systems, human operators are sometimes called upon to review the status of a subscriber. For example, a subscriber who is locked out of his account by a cloned phone may call a customer care site to request that he be reinstated. Conventional subscriber systems store only certain very limited information about the most recent transaction for each MIN in a subscriber database. The customer care site expects to receive queries from clones attempting to access the system. Thus, the limited information in the subscriber database can lead a human system to believe that the legitimate subscriber is actually a clone, since the clone was the last to cause an entry in the subscriber database. If more data was easily available, the human operator would be able to discern that a clone had last accessed the system.

SUMMARY OF THE INVENTION

The present invention provides a method and apparatus for organizing event maintenance data processed by an AC on a per MIN/ESN basis. All TCAP (Transaction Compatabilities Application Part) messages processed by a particular AC contain a MIN (Mobile Identification Number) of the caller originating the message and an ESN (Equipment Serial Number) of the handset. These values allow the AC to store information about the message in association with the actual subscriber's data record in a subscriber database. Such organization makes it quicker and easier to retrieve the last "n" events (TCAP messages) processed for a MIN/ESN pair.

In general, transactions for a MIN/ESN pair relate to transactions for a certain subscriber. Transactions for a certain MIN/ESN pair can also, however, relate to transactions for cloned handsets using the MIN/ESN pair of the legitimate subscriber.

In accordance with the purpose of the invention, as embodied and broadly described herein, the invention relates to a method for storing event data in a wireless communication system, comprising the steps performed by a data processing system, of: processing an event data transaction; extracting a key from the event data transaction; storing at least a part of the event data transaction as a subrecord of a subscriber database corresponding to the key; and storing at least a portion of a response of the transaction in a subrecord of the subscriber database corresponding to the key.

In accordance with the purpose of the invention, as embodied and broadly described herein, the invention relates to a method for storing event data in a wireless communication system, where a first TCAP message has been processed and corresponding event data has been stored in subrecord of a subscriber database, comprising the steps performed by an Authentication Center (AC), of: processing a second TCAP message for a MIN/ESN pair; extracting a key from the second TCAP message, the key identifying the MIN/ESN pair; and storing event data of the TCAP message as a second subrecord of the subscriber database corresponding to the key, so that event data of multiple TCAP messages is stored in the subscriber database on a per MIN/ESN basis.

A fuller understanding of the invention will become apparent and appreciated by referring to the following description and claims taken in conjunction with the accompanying drawings.

BRIEF DESCRIPTION OF THE DRAWINGS

FIG. 4(b) is a flow diagram of an SSD update operation when the system allows an AC to share Shared Secret Data (SSD) with an MSC.

FIG. 6(a) is a flow chart showing steps performed by the AC to store information about processed TCAP messages in the subscriber database.

FIG. 6(b) is a flow chart showing steps performed by the AC to retrieve information about data stored on a per MIN/ESN basis.

FIGS. 7(a) and 7(b) show parameters of an Authentication Request (AUTHRQST) message.

FIGS. 8(a) and 8(b) show parameters of a response to an Authentication Request (AUTHRQST) message.

FIGS. 9(a) and 9(b) show parameters of an Authentication Directive (AUTHDIR) message.

FIG. 10 shows parameters of a response to an Authentication Directive (AUTHDIR) message.

DETAILED DESCRIPTION OF A PREFERRED EMBODIMENT

A. General Discussion of Cellular Telephone Technology

The following section provides an overview of cellular telephone technology and serves as a prelude to a more specific discussion of the present invention.

1. System Overview

Wireless communications are provided through a wireless communication network, which can be realized, for example, as a Signaling System 7 (SS7) network. The SS7 network uses the EIA/TIA Interim Standard 41 (IS-41) protocol, which is the standard commonly used in North America. A description of the SS7 network and the IS-41 protocol can be found in *Signaling System #7*, by Travis Russell, and *The Mobile Communications Handbook*, by Jerry Gibson, both of which are herein incorporated by reference.

Figure 1:
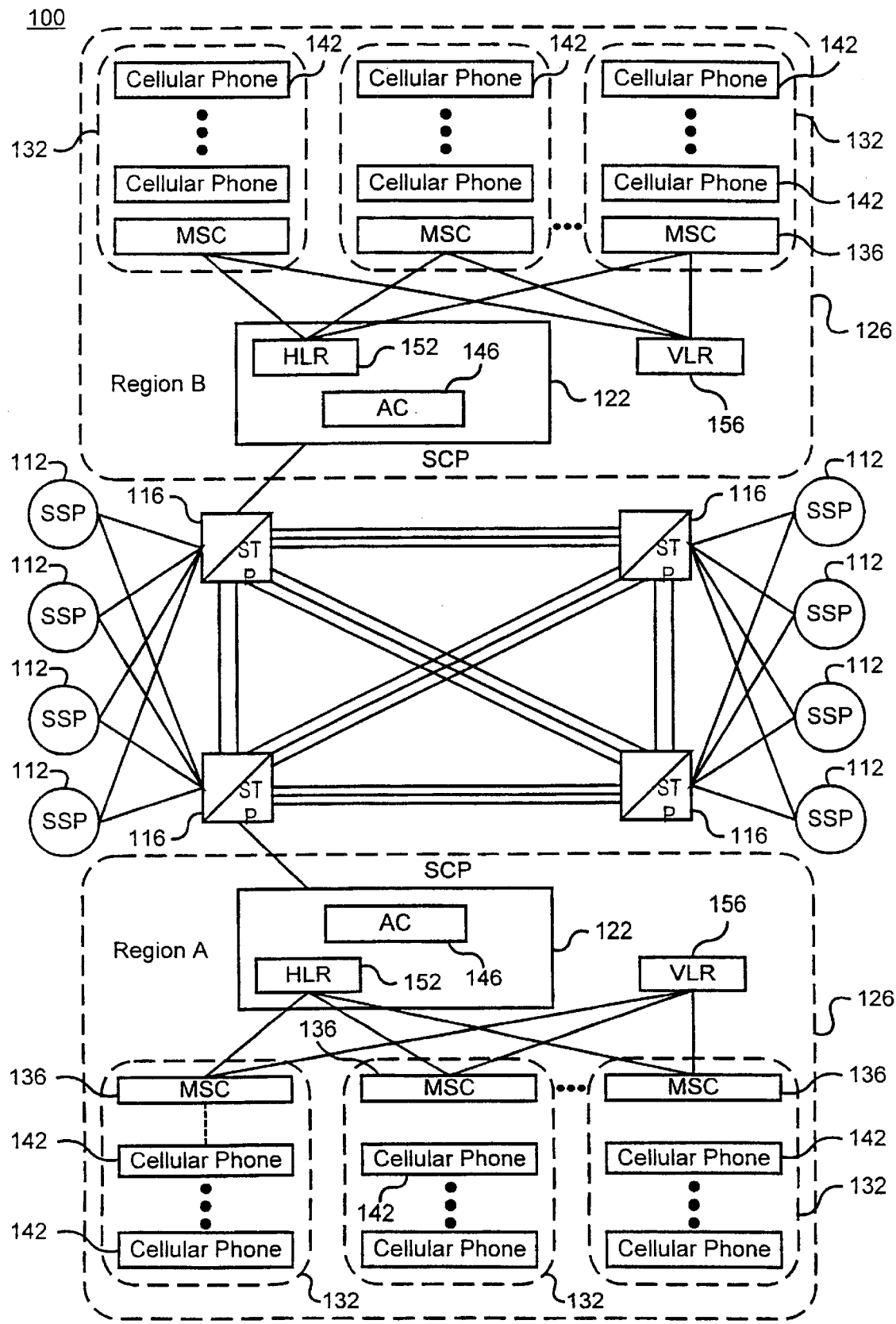
FIG. 1 depicts a typical SS7 communication network.

The SS7 network is used for switching data messages pertaining to connecting telephone calls and for maintaining the signaling network. As shown in FIG. 1, the SS7 network 100 has three different types of nodes or signaling points: Service Switching Point (SSP) 112, Signal Transfer Point (STP) 116, and Service Control Point (SCP) 122.

An SSP 112 is an local exchange in the telephone network. An SSP 112 uses the information provided by the calling party (such as dialed digits) and determines how to connect the call. An STP 116 serves as a router in the SS7 network and switches SS7 messages as received from the various SSPs 112 through the network to their appropriate destinations. An STP 116 receives messages in packet form from an SSP 112. These packets are either related to call connections or database queries for an SCP 122. If the packet is a request from an SSP 112 to connect a call, the message must be forwarded to the destination where the call will be terminated. The destination is determined by the dialed digits. If the message is a database query seeking additional information regarding a person who subscribes a wireless service, i.e., a "subscriber", the destination will be a database. Access to telephone company databases is provided through an SCP 122. These databases are used to store information about subscribers' services, calling card validation, fraud protection, etc.

As shown in FIG. 1, the wireless network is shared by multiple regions 126, such as regions A and B. In each region 126, an SCP 122 is provided. Each region 126 is further divided into a number of registration areas 132, each of which is served by a Mobile Switching Center (MSC) 136. An MSC 136 provides wireless communication services to all properly registered cellular phones 142 in the registration area.

As illustrated in FIG. 1, an SCP 122 contains an Authentication Center (AC) 146 and a Home Location Register (HLR) 152. AC 146 authenticates a subscriber's cellular phone through the use of a number called the A-Key. HLR 152 is used to store information regarding cellular subscribers in the region for which it provides services. HLR 152 also stores information regarding billing, as well as information identifying the services allowed for each subscriber. In addition to these, HLR 152 stores the current locations of cellular phones 142 of those subscribers who activated their cellular phones through a wireless service provider in the region the HLR serves. This region is also referred to as the "home area" of those subscribers. Although not shown, a backup HLR is also provided in SCP 122. A VLR 156, which is used when a cellular phone 142 is not recognized by a local MSC/VLR, stores the current locations for the visiting subscribers.

Each cell phone (MS) connects to a base station through a connection 127. A MSC/VLR connects to one or more base stations. This connection includes a voice channel and a control channel, which is usually implemented as a radio channel. As discussed below, the types of information sent over the voice channel and the control channel vary between MSC/VLRs from different manufacturers.

2. Registration and Roaming

Figure 2:
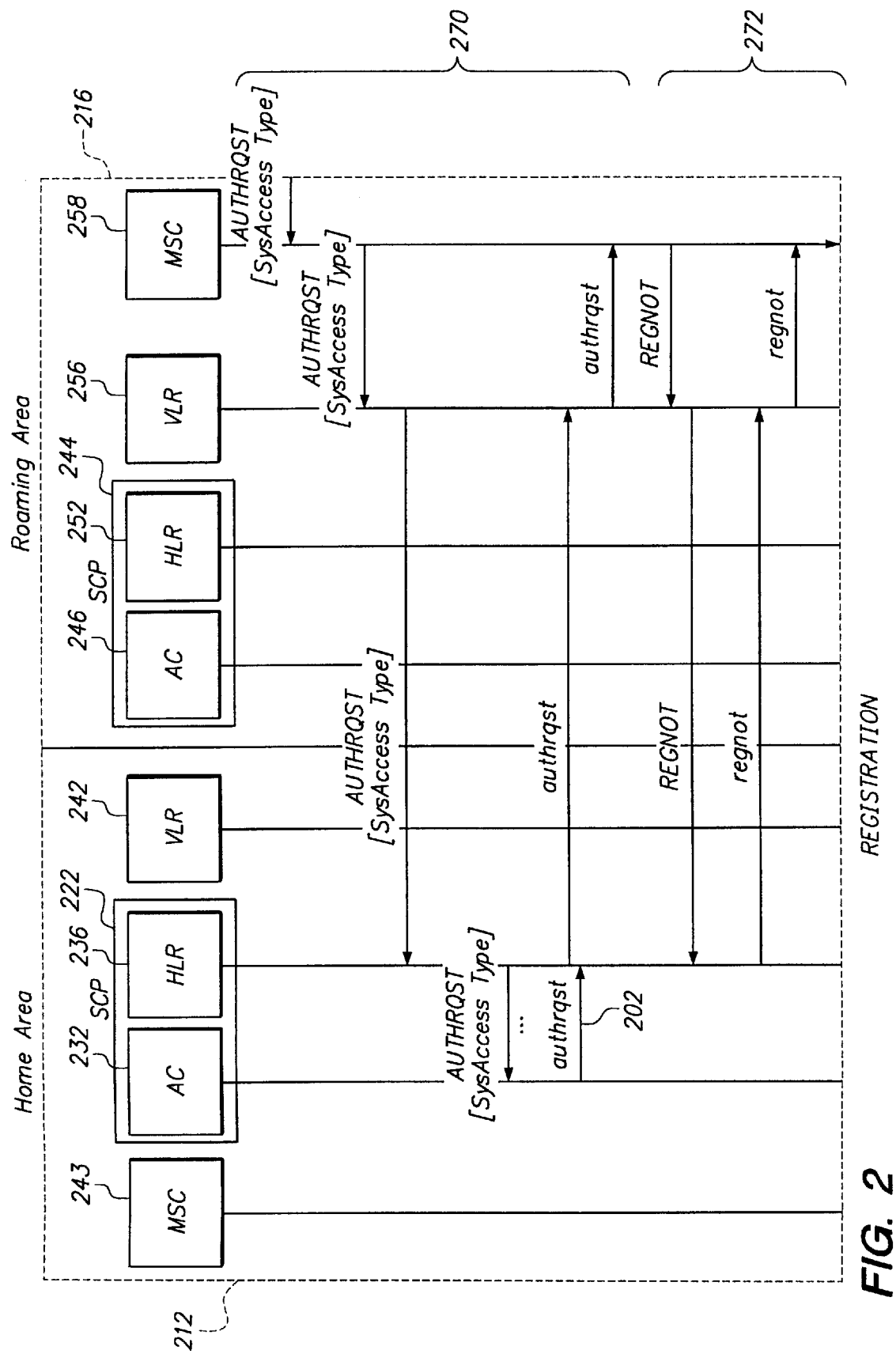
FIG. 2 is a flow diagram of steps performed when a roaming cellular telephone enters a new roaming area.

FIG. 2 illustrates registration of a cellular phone that has "roamed" outside of its home area 212 into a roaming area 216. Home area 212 and roaming area 216 correspond to two regions, such as regions A and B, respectively, shown in FIG. 1. In home area 212, an SCP 222 includes an AC 232 and a HLR 236. An MSC 243, having an associated VLR 242 jointly called an "MSC/VLR"), is also located in home area 212. In roaming area 216, an SCP 244 includes an AC 246 and a HLR 252. An MSC 258 is also located in roaming area 216. In FIG. 2, although MSCs are shown as separate entities from the HLR and VLR in the respective areas, in a actual application the HLR/VLR functions may be integrated with the MSCs.

When an MSC/VLR detects that a phone capable of authentication has roamed into its area, the MSC/VLR sends Authentication Request (AUTHRQST) messages to the AC. As shown in FIG. 2, when a cellular phone roams into a new area, it sends an AUTHRQST message, which is received by the MSC 258 for the area. MSC 258 and AC 232 exchange a plurality of AUTHRQST messages 270, and the AC sends back a response indicating whether the phone is allowed to operate in the new area. (In FIG. 2, responses to messages are indicated by lower case letters).

After the phone has been authenticated, it registers its location with its home HLR 222, as shown by messages 272. Both AUTHRQST and REGNOT messages are well-known to persons of ordinary skill in the art and will not be described in detail herein.

3. Call Origination

Figure 3:
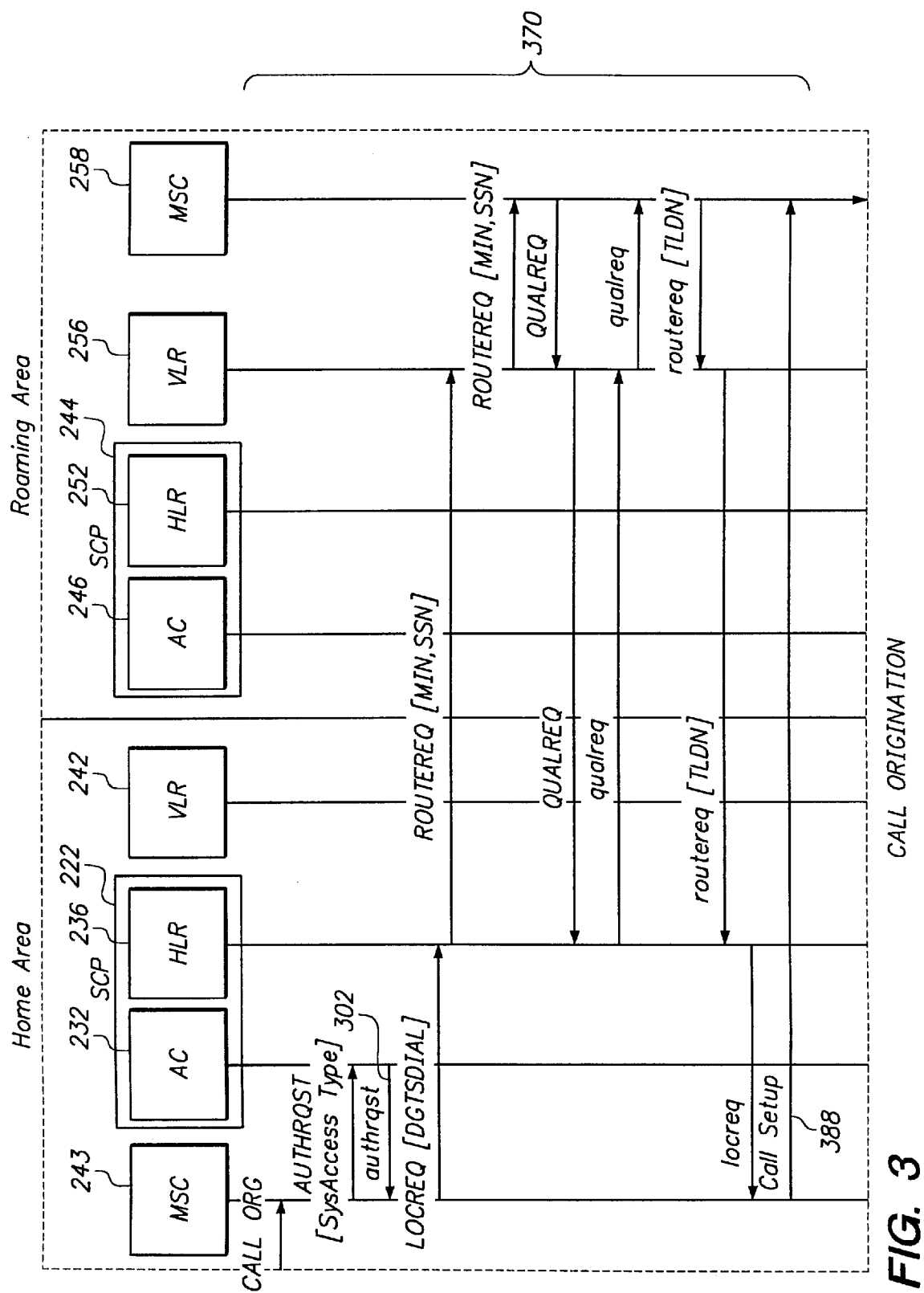
FIG. 3 is a flow diagram of steps performed when a call is made from one area to another.

As shown in FIG. 3, when a calling party desires to place a call to a receiving party, the phone sends a call origination (CALL ORG) message, which includes the digits of the phone number to be dialed. Again, the MSC/VLR and AC exchange AUTHRQST messages, to ensure that the calling phone has authorization to place a call.

Originating MSC 243 sends a location request (LOCREQ) message containing the dialed digits to HLR 236 in home area 212. Upon receiving the dialed digits, the HLR 236 accesses its internal data structures to find the associated Mobile Identification Number (MIN) for the receiving party's cellular phone in a subscriber database to determine if the receiving party is a legitimate subscriber. HLR 236 sends a routing address request (ROUTREQ) message to VLR 256 in roaming area 216 where the receiving party's cellular phone is currently registered. The current location information about the receiving party's cellular phone was sent to HLR 236 by VLR 256 after the receiving party arrived the roaming area and the cellular phone registered with VLR 256. The ROUTREQ message contains the associated MIN of the receiving party's cellular phone. VLR 256 then forwards the ROUTREQ to MSC 258 currently serving the receiving party's cellular phone. MSC 258 is also referred to as a serving MSC. In response to the ROUTREQ, serving MSC 258 consults its internal data structures to determine if the receiving party's cellular phone is already engaged in a call on this MSC. Assuming that the cellular phone is not known to serving MSC 258, serving MSC 258 may then obtain the receiving party's profile from its VLR 256 by sending it a qualification request (QUALREQ) message. If the receiving party's cellular phone is unknown to VLR 256 or if the information requested is not available at VLR 256, VLR 256 sends the QUALREQ message to HLR 236 in home area 212. HLR 236 then sends a qualreq response to VLR 256. The qualreq response contains relevant information about the receiving party's profile. VLR 256 in turn sends the qualreq response to serving MSC 258. Upon receiving the qualreq, serving MSC 258 allocates a temporary identifier TLDN (Temporary Local Directory Number) and returns this information to VLR 256 in the routreq message. VLR 256 in turn sends the routreq message to HLR 236. When the routreq message is received by HLR 236, it returns a locreq response to originating MSC 243. The locreq response includes routing information including the MSCID of serving MSC 258 and the TLDN. Finally, originating MSC 243 establishes a voice path to serving MSC 258 using existing interconnection protocols (e.g., SS7) and the routing information specified in the locreq response, as illustrated at step 388.

4. SSD Updates and Unique Challenges

The described embodiment of the present invention uses the CAVE (Cellular Authentication and Voice Encryption) algorithm to authenticate cellular phones in the system. The CAVE algorithm is described, for example, in TR-45, which is herein incorporated by reference. Using the CAVE algorithm, the AC periodically orders an MSC/VLR to perform one or both of an SSD update or a unique challenge operation. These orders are typically included as a part of other messages sent by the AC. For example, in FIGS. 2 and 3, the AC may issue SSD update orders and unique challenge orders as a part of any of the messages it sends to an MSC/VLR. Thus, for example, authrqst message 202 of FIG. 2 may or may not include an order to perform an SSD update or to perform a unique challenge. Similarly, authrqst message 302 of FIG. 3 may include such orders if the AC determines that they are needed for a particular subscriber. The formats of these orders are discussed below. The parameters of an authrqst response are discussed below.

FIG. 4(*a*) is a flow diagram of an SSD update operation when the system allows the AC to share SSD (Shared Secret Data) with the VLR. In contrast, FIG. 4(*b*) is a flow diagram of an SSD update operation when the system does not allow the AC to share SSD. FIGS. 4(*a*) and 4(*b*) also include a handset (called a "Mobile Station" or "MS") 406. SSD is a parameter defined in the IS-41 standard. It is used as an intermediate input value to the CAVE algorithm and is stored in both the AC and MS. As indicated in the figures, some MSC/VLRs are allowed to have access to SSD and some are not depending on how the system is configured.

In FIG. 4(*a*), the orders to perform an SSD update (and a unique challenge) are incorporated into the authrqst response messages 407. The format of an authrqst response message is discussed below. In FIG. 4(b), the orders to perform an SSD update (and a unique challenge) are incorporated into the AUTHDIR message 404. The format of an AUTHDIR message is discussed below. The specific messages sent during SSD update are not the subject of the present invention.

5. Authentication Center (AC)

Figure 5A:
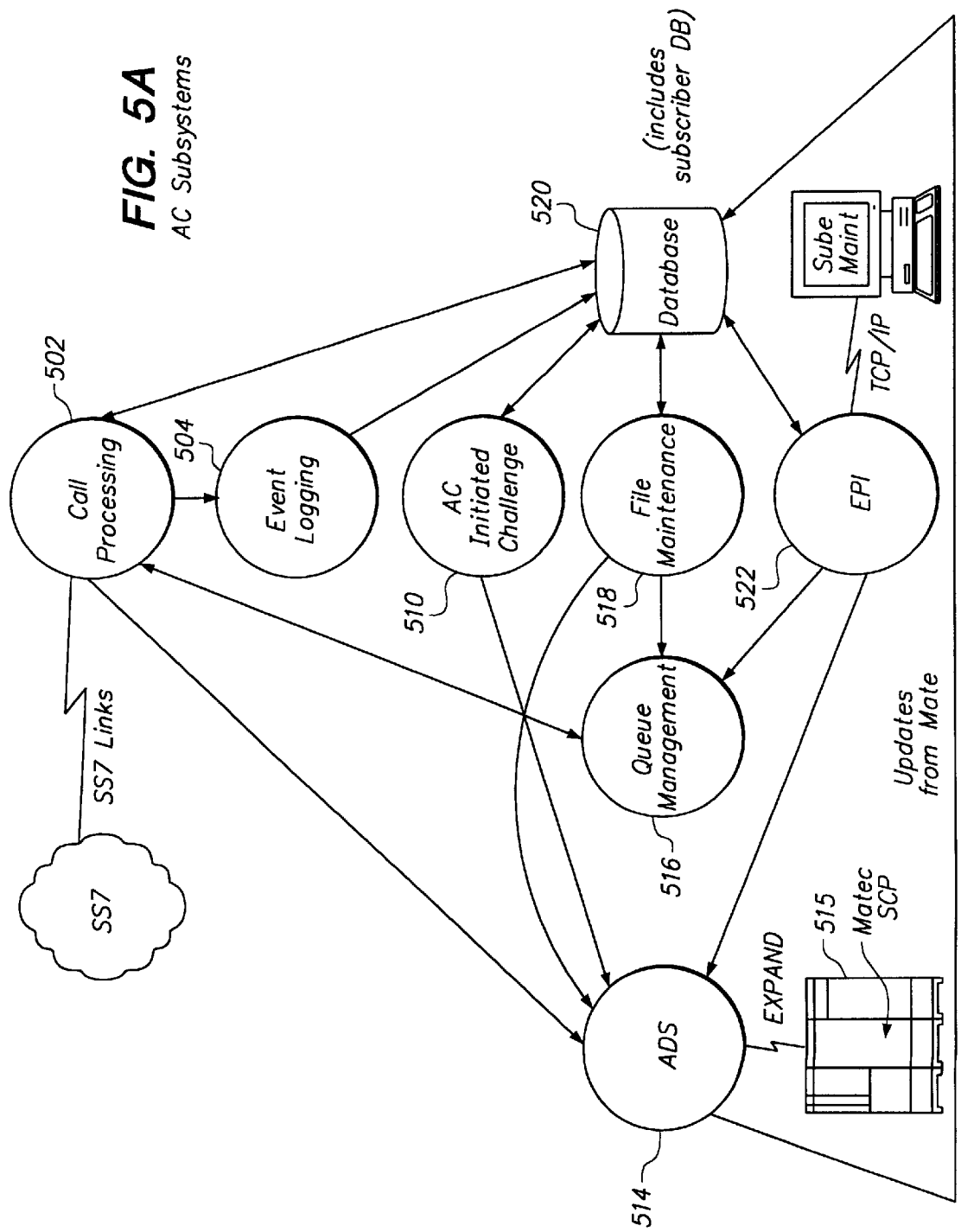
FIG. 5(a) is a block diagram of subsystems in an AC of a preferred embodiment of the present invention.
Figure 5B:
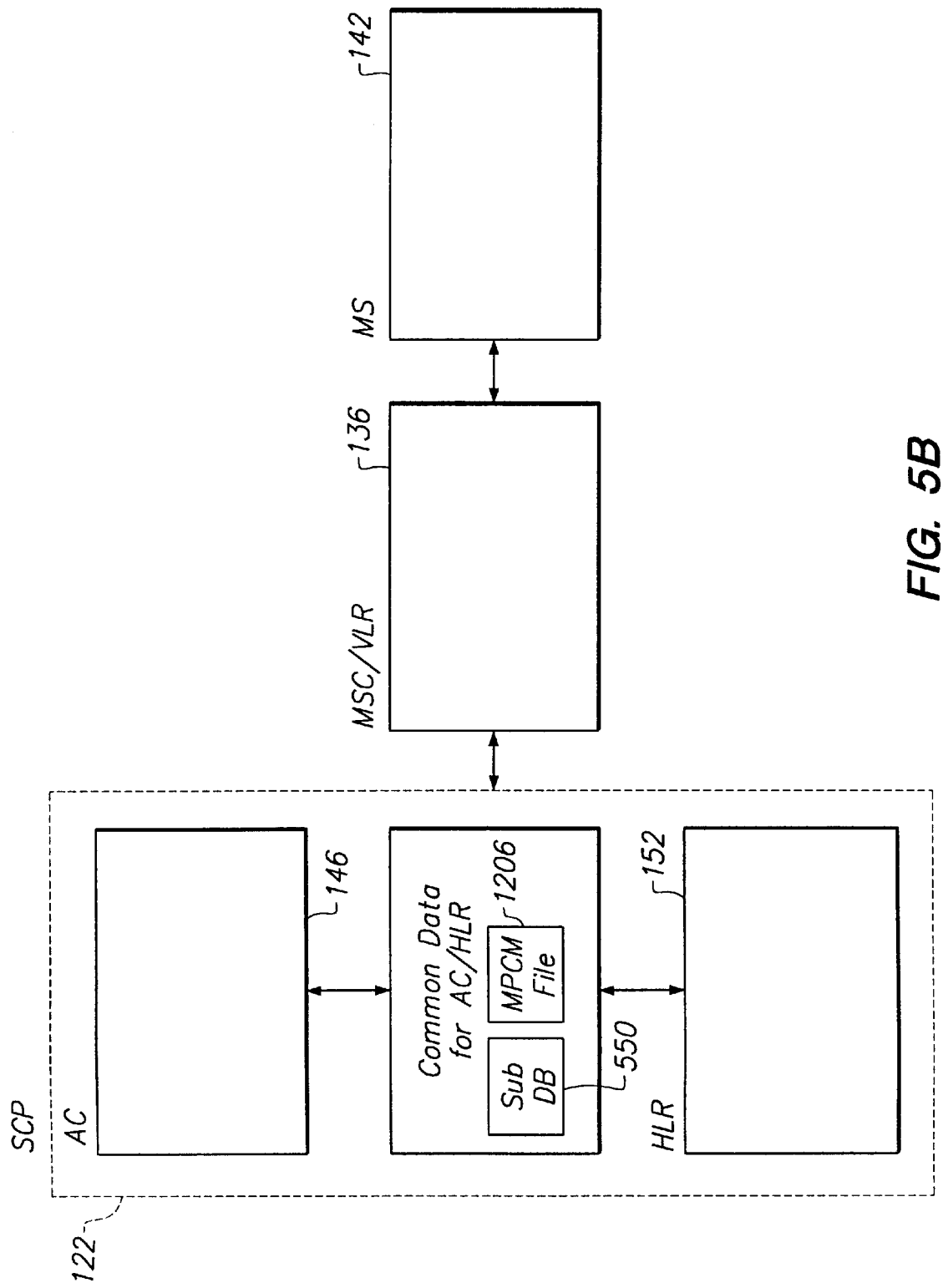
FIG. 5(b) is a block diagram of an AC, HLR, MSC/VLR, and MS, showing the A-Key value that is stored only in the AC and the MS.

FIG. 5(a) is a block diagram of subsystems in an AC of a preferred embodiment of the present invention. It will be understood that each of the subsystems of FIG. 5(a) is implemented as software instructions stored in a memory and executed by a processor. FIG. 5(b) is a block diagram of an AC, HLR, MSC/VR/ and MS. Some MSC/VLRs are allowed to "share" the SSD and some are not. The AC and HLR can both access the MPCM file, which contains information about the configuration of various MSC/VLRs, indexed by MSCID. The AC and HLR can both access the subscriber file 550, which contains information about subscribers indexed by MIN/ESN (or solely by MIN). In FIG. 5(a), an AC Call Processing subsystem AC Call Processing subsystem 502 is responsible for processing of authentication TCAP (Transaction Compatabilities Application Part) messages. TCAP messages are defined in, for example, ANSI standard T1.114 "American National Standard for Telecommunication Signaling System 7 (SS7)—Transaction Compatabilities Application Part (TCAP)," which is incorporated herein by reference. Thus, AC call processing subsystem 502 handles the following IS-41 authentication messages (TCAP) and associated responses:

Authentication Directive,

Authentication Failure Report,

Authentication Request,

Authentication Status Report,

Base Station Challenge,

Security Status Report.

Some implementations also handle a Count Request TCAP message.

Each of the above messages (except the Base Station Challenge and the Count Request) can contain orders for an SSD update and/or a unique challenge. Processing of messages includes message parsing, message validation, decision logic processing, event generation, statistics generation, message creation, message sending and database accessing and updating. Inbound messages are received from an HLR. Responses to a message is returned to the same HLR. Outbound messages are preferably generated from the processing of a queue message received from a Queue Management Facility (external to the AC).

AC Call Processing subsystem 502 is also responsible for generation of various required random numbers and the generation of Shared Secret Data (SSD). The AC Call Processing subsystem preferably supports the Authentication Algorithm Version C7, and is structured such that the library routines used for the CAVE algorithm and for random number generation can be easily replaced or enhanced. Subsystem 502 also includes library routines for the encryption/decryption of sensitive data used by the CAVE algorithm.

AC Call Processing subsystem 502 will also receive challenge due notification messages from an AC Initiated Challenge subsystem 510 via the external Queue Management Facility. These messages include "Initiate Immediate SSD Update" and "Initiate Unique Challenge" events.

AC Call Processing subsystem 502 is also responsible for the generation of log events. Whenever a TCAP message is processed by the AC, the AC performs steps to log information concerning the TCAP message in the subscriber database on a per MIN/ESN basis, as described below in connections with FIGS. 6 and 11.

An ADS Subsystem 514 is responsible for communicating with a "mated" SCP 515 and for ensuring that the databases of the two systems remain in synch. An External Provisioning Interface (EPI) 522, available from Tandem Computers, Inc., provisions data from the subscriber database using ITU-T ASN.1 standard messages.

AC Initiated Challenge subsystem 510 is composed of the AC Initiated Challenge Process, which is responsible for the Authentication Center initiation of periodic authentication verification and SSD updates on a per MIN/ESN basis. AC Initiated Challenge subsystem 510 uses the configuration information provided by an Authentication System Parameters (ACSP) file to determine whether or not periodic SSD updates are in effect, and to determine the associated frequency and interval characteristics of the updates and challenges.

To help reduce fraud by randomizing these operations, the amount of time between challenges initiated by the AC Initiated Challenge subsystem 510 is variable based upon the last SSD Update timestamp from the subscriber database and upon the AC initiated challenge frequency and interval width information configured in the ACSP file. The AC initiated frequency is defined as the desired average frequency of occurrence of a challenge. The AC initiated challenge interval width is defined as the total width of the interval for the AC initiated frequency. For example, if the authentication challenge had an AC initiated frequency of 120 minutes and an AC initiated interval width of 60 minutes, the authentication challenges for a particular subscriber would occur randomly between 90 and 150 minutes.

The AC Initiated Challenge Process will sequentially examine each subscriber in the subscriber database to determine if it is time to initiate a unique challenge or SSD update for the subscriber. For each subscriber database record, the AC Initiated Challenge Process 510 calculates the subscriber's "time to update SSD". If any of these calculated timestamps are less than or equal to the current timestamp, the AC Initiated Challenge Process 510 will update the subscriber record to indicate the operation is needed. The operation will then be performed on the next access of the system by the subscriber. The formulas for the calculation of these subscriber challenger timestamps are defined below.

Multiple copies of the AC Initiated Challenge process 510 can be configured for each SCP node with each copy having a subset of the subscriber database. The subsets will be partitioned among the various copies of the AC Initiated Challenge Process based upon the primary key of the subscriber database. This partitioning methodology allows for balanced workload and prevents I/O contention on the subscriber database.

The following formulas are used for the calculation of the three subscriber challenge timestamps:

LADT=last unique challenge attempt timestamp from the subscriber database record LSDT=last SSD update attempt timestamp from the subscriber database record AF=AC initiated unique challenge frequency (X1) from ACSP file (minutes)

AV=AC initiated unique challenge width (X1) from ACSP file (minutes)

SF=AC initiated SSD update frequency (X2) from ACSP file (days)

SV=AC initiated SSD update width (X2) from ACSP file (days)

R=Random number between 0 and 1

The "time to do unique" challenge timestamp is calculated as follows;

$$LADT+AF+(R-0.5)*AV$$

The "time to update SSD" challenge timestamp is calculated as follows;

$$LSDT+SF+(R-0.5)*SV$$

B. Logging Event Data On a Per MIN/ESN basis

FIG. 6(a) is a flow chart showing steps performed by the AC to store information about processed TCAP transactions in the subscriber database. A "transaction" is defined as both a TCAP request (also called an INVOKE) and any response to the TCAP request (such as an AUTHDIR and a response to the AUTHDIR or an AUTHRQST and a response to the AUTHRQST). FIG. 6(b) is a flow chart showing steps performed by the AC to retrieve information about data maintenance events stored on a per MIN/ESN basis.

As shown in FIGS. 6(a) and 6(b), whenever the AC processes a TCAP message and a response to the TCAP message (or, for example, a timeout occurs), it extracts the MIN and ESN from the messages. These values serve as a key into the subscriber database. The AC then extracts appropriate values from the TCAP messages of the transaction and stores them directly into the corresponding record in the subscriber database, using the MIN/ESN as a key to the record. As shown in FIG. 11(b), the AC also stores information about the results of processing the TCAP message in the same record. Each subscriber database record stores information about the last (most recent) "N" TCAP messages processed for the record's MIN/ESN. Conversely, the AC can extract any of the last N messages, using the subscriber's MIN and ESN as a key into the subscriber database. In a preferred embodiment of the present invention, N=3. In a preferred embodiment of the present invention, an External Provisioning Interface (EPI) server exists between the subscriber database, which is stored as raw binary data, and a display client, such as a Java-based browser display client. The EPI takes queries from the display client and provisions data from the subscriber database for the client, which displays it in human readable form in a manner known to persons of ordinary skill in the art. Other implementations can use other data display methods or can display the data from the subscriber database record in raw form.

The present invention allows retrieval of the last N TCAP messages for a MIN/ESN pair in real-time. Thus, it is quick and easy to obtain information about the last N TCAP messages processed for a particular MIN/ESN pair and the result of processing those TCAP messages. Because the information is maintained in the actual subscriber data record in the subscriber database, it is instantaneously available for each MIN/ESN pair without additional processing or analysis.

Figure 4A:
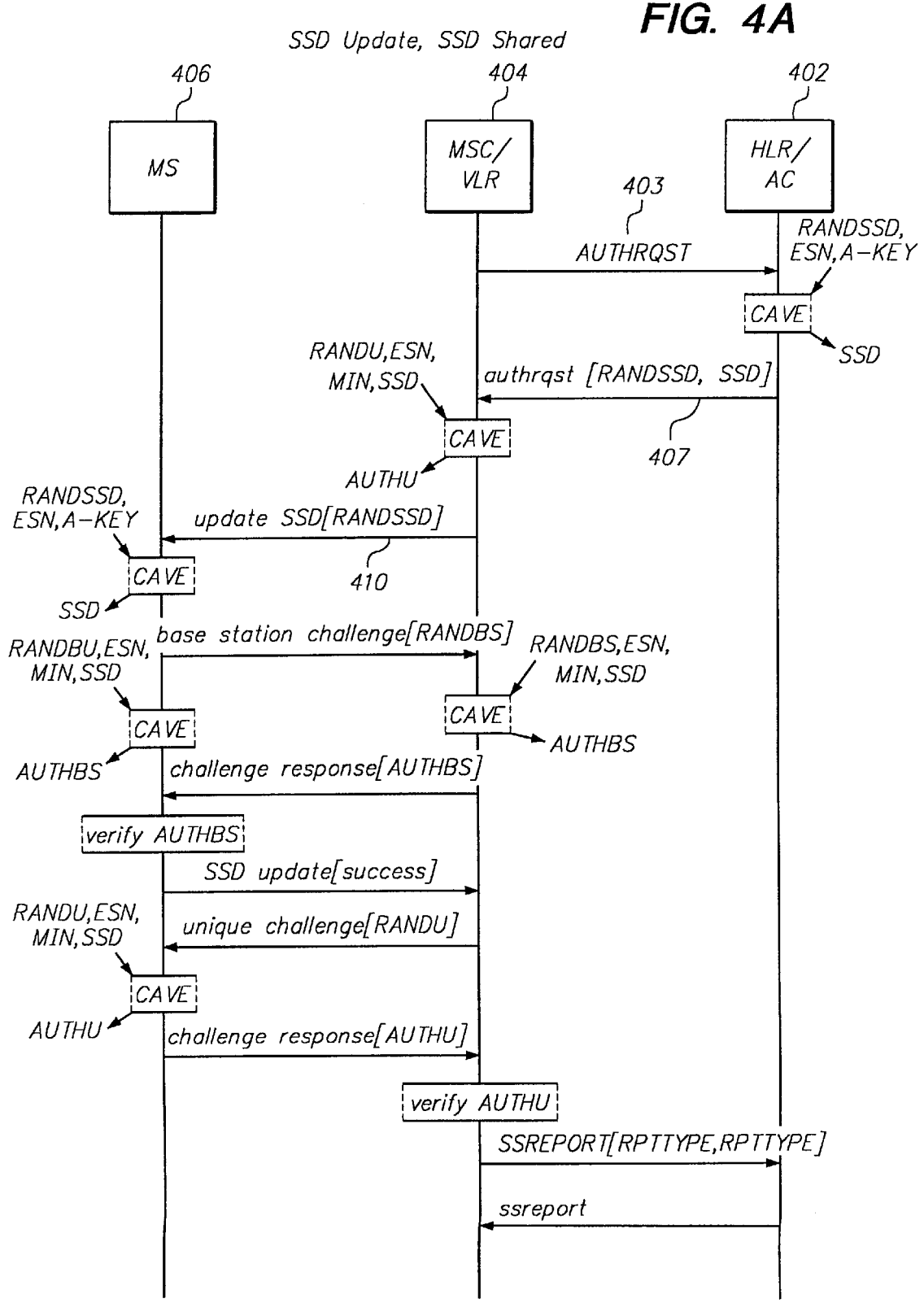
FIG. 4(a) is a flow diagram of an SSD update operation when the system does not allow an AC to share Shared Secret Data (SSD) with an MSC.

As shown in FIG. 4(a) above, when an AC in a wireless communication system shares SSD with MSC/VLRs, the AC rarely processes TCAP messages. Thus, there may be weeks or months between receipts by the AC of a TCAP message for a particular MIN/ESN pair. The present invention saves having to sort through many months of logged messages to find the most recent N messages for that MIN/ESN pair. In some cases, logged messages are not saved for a long enough period that N past TCAP messages are even available. A preferred embodiment of the present invention also saves processed TCAP messages to a log file.

Even if the log file is deleted after a predetermined time, the last N transaction records for a MIN/ESN pair are retained in the subscriber database. Although ACs that do not share SSD receive TCAP messages on a more frequent basis, the same problem can occur when systems do not save more than one or two months worth of TCAP messages in their logs.

TCAP data stored on a per MIN/ESN basis is useful, for example, in a live production environment, such as a customer care site. The present invention enables a customer representative to observe multiple past TCAP message information for a particular MIN/ESN pair without having to wait for the data to be analyzed or pulled from a central TCAP log file. For example, a customer representative may perform a manual SSD update for a subscriber. Using the present invention, the customer representative can look at the subscriber database for the subscriber's MIN.ESN and see the AUTHDIR, Base station challenge, and Authentication status report transactions in the record for the subscriber's MIN/ESN. In conventional systems, the customer representative has no immediate way of confirming that the SSD update was completed.

Event maintenance data stored on a per customer basis is also useful, for example, during system testing, since all of the transactions processed for a MIN/ESN pair are immediately available to testing personnel. Instead of using a testing tool that lets testing personnel monitor a line and see the message traffic on a link, for example, the present invention allows testing personnel to merely monitor the subscriber database to observe the data for one or more MIN/ESN pairs.

Figure 11A:
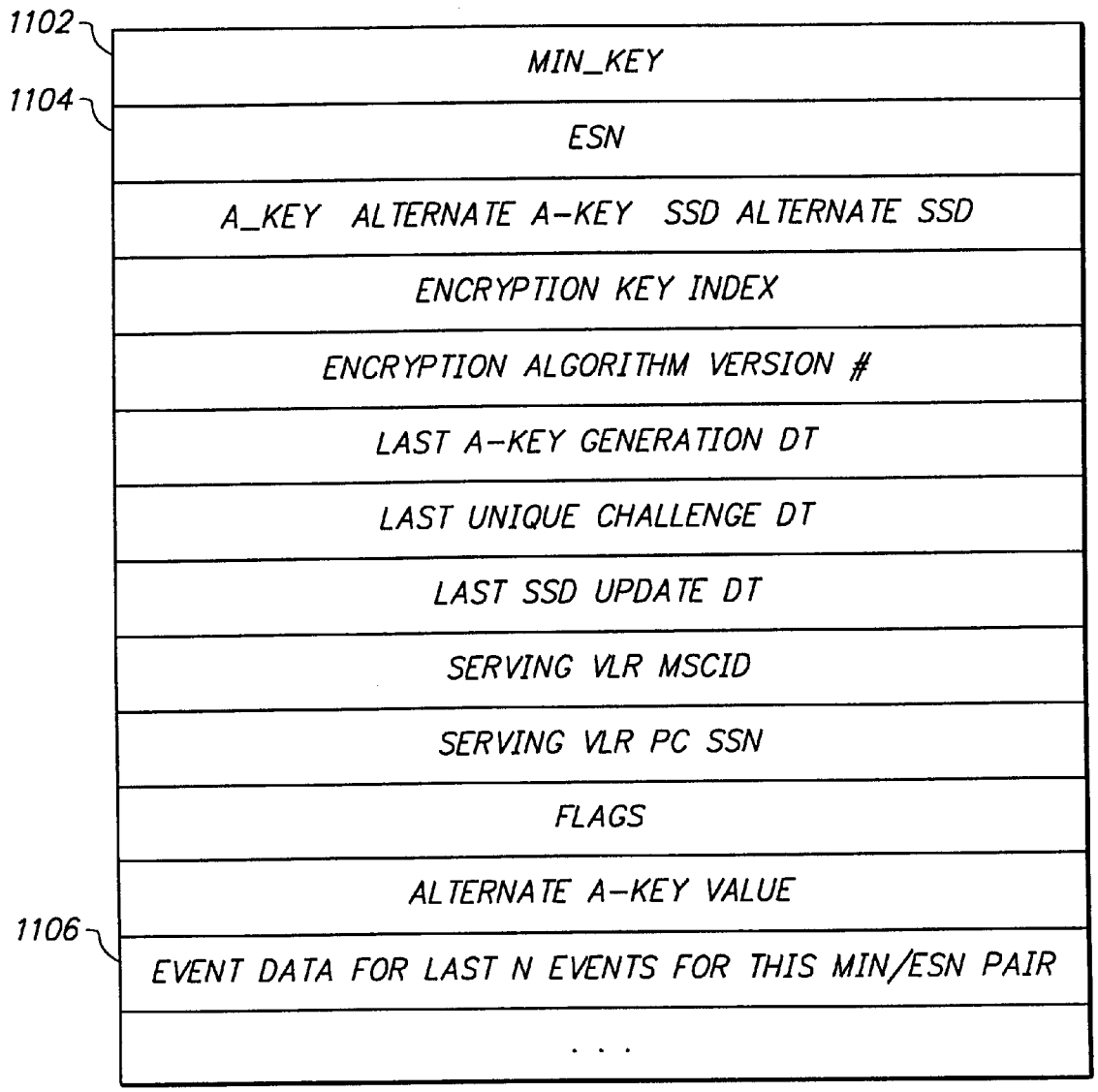
FIGS. 11(a) and 11(b) show a format of a record in a subscriber database.
Figure 11B:
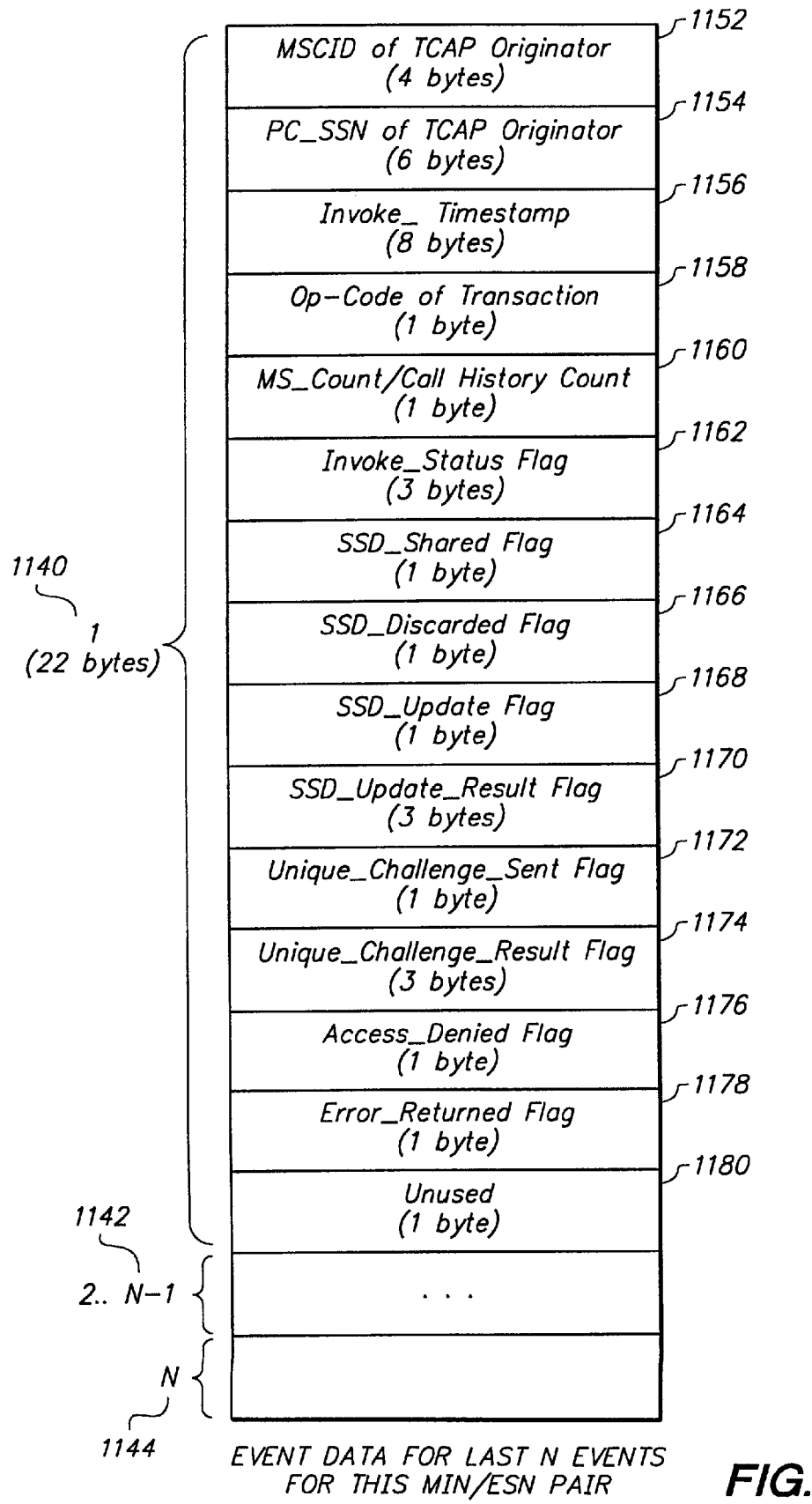

FIGS. 11(a) and 11(b) show a format of a subscriber record in a subscriber database. It should be understood that the format of the record shown is exemplary only and is not intended to limit the scope of the present invention. Other implementations may include different and/or additional information in a record or subrecord. As discussed above, the MIN/ESN pair 1102/1104 is used as a key for a subscriber record in this database. Use of both the MIN and the ESN can aid in authentication of the subscriber. Alternately, only the MIN could be used as a key for the subscriber database. Each subscriber record includes event data 1106 for N transactions for this MIN/ESN pair, details of which are shown in FIG. 11(b). In a preferred embodiment, 3, although N can be any appropriate number. In a preferred embodiment, N can be configured so that N can be a different number for each record in the subscriber database.

FIG. 11(b) shows details of data stored for a first one of N TCAP messages sent for a MIN/ESN pair. Each of the N subrecords 1140, 1142, and 1144 includes the following data:

MSCID of TCAP Originator 1152:

This field indicates the MSCID from which the INVOKE received by the AC was initiated. This field is only present in Authentication Requests and Authentication Failure Reports. This field is preferably 4 bytes long.

PCSSN of TCAP Originator 1154:

This field identifies the point code of the originator of the INVOKE. This field will contain blanks if the PCSSN is in the subscriber's HLR. This field is preferably 6 bytes long.

Invoke Timestamp 1156:

This field contains the date and time the INVOKE was received or sent by the AC. This field is preferably 8 bytes long.

Opcode of Transaction 1158:

This field contains the operation code or the transaction type of the INVOKE received or sent by the AC. This field is preferably 1 byte long.

Valid values include:

0—unknown
27—Authentication Directive
28—Authentication Request
30—Authentication Failure Report
40—Authentication Status Report
158—Security Status Report (TSB-51)

MS COUNT/Call History Count 1160:

This field contains the Call History Count from the subscriber's mobile station (MS), as reported by the Serving MS/VLR. A value of "64" indicates that the serving MSC/VLR did not report the Call History Count. This field is preferably 1 byte long.

Invoke Status Flag 1162:

This flag indicates the authentication status of the subscriber after an inbound INVOKE is processed or indicates if an outbound INVOKE was processed. This field is preferably 3 bits long.

Valid values include:

0—unknown (INVOKES Received)
1—Successful (INVOKES Received)
2—Failed (INVOKES Received)
3—Processed (INVOKES Sent)
4—Not Processed (INVOKES Sent)

SSD Shared Flag 1164:

This flag indicates whether or not SSD was sent to the switch in a TCAP RETURN RESULT. This field is preferably 1 bit long.

Valid values include:

0—No; SSD was not shared
1—Yes; SSD was shared

SSD Discarded Flag 1166:

This flag indicates whether or not the NoSSD parameter set to 'DiscardSSD' was included in the message sent by the AC (INVOKE OR RETURN RESULT). This field is preferably 1 bit long.

Valid values include:

0—No; Discard SSD was not ordered
1—Yes; Discard SSD was ordered

SSD Update Flag 1168:

This flag indicates if an SSD Update was initiated by the AC. This field is preferably 1 bit long.

Valid values include:

0—No; SSD update was not initiated
1—Yes; SSD update was initiated

SSD Update Result Flag 1170:

This flag contains the result of a previously ordered SSD update. SSD update results are only reported in INVOKES received by the AC. This field is preferably 3 bits long.

Valid values include:

0—Not Applicable
1—Successful
2—Failed
3—Unknown

Unique Challenge Sent 1172:

This flag indicates whether or not a Unique Challenge was sent to the switch in a TCAP RETURN RESULT. This field is preferably 1 bit long.

Valid values include:

0 —No; Unique Challenge was not initiated
1 —Yes; Unique Challenge was initiated Unique Challenge Result Flag 1174:

This flag contains the result of a previously ordered or autonomous Unique Challenge. Unique Challenge results are only reported in INVOKES received by the AC. This field is preferably 3 bits long.

Valid values include:

0 —Not Applicable
1 —Successful
2 —Failed
3 —Unknown

Access Denied Flag 1176:

This flag indicates if the AC included the 'AccessDenied' parameter in the TCAP message sent. This field is preferably 1 bit long.

Valid values include:

0—No; Access was not denied
1—yes; Access was denied

Error Returned Flag 1178:

This flag indicates if a RETURN ERROR was sent in response to the INVOKE (by the AC or sent to the AC). This field is preferably 1 bit long.

Valid values include:

0—No; Return Error was not sent
1—yes; Return Error was sent

Field 1180 is currently unused.

C. Format of TCAP Messages

As discussed above, the AC sends SSD updates and unique challenges as a part of several different types of messages. The following section includes descriptions of message and file formats used by the system and by the steps of FIG. 6. These formats are known to persons of ordinary skill in the art and are included here for clarity of example. Only relevant fields are discussed. Columns marked either "R" or "C" indicate that the field is required or contingent (optional).

FIGS. 7(*a*) and 7(*b*) show parameters in an Authentication Request (AUTHRQST) message. This message is sent from an MSC/VLR to the AC. A Mobile Identification Number (MIN) 702 identifies the subscriber making the request. Steps 602 and 604 of FIG. 6 check flags in the subscriber database to determine whether an SSD update or unique challenge needs to be sent for the subscriber having the MIN in field 702. Alternate embodiments may use additional methods to determine if an SSD update or unique challenge needs to be sent.

A System Access Type 704 identifies the type of system access made by the MS. In the described embodiment, the possible system access types are:

0—not used
2—Flash request
1—Unspecified
3—Autonomous registration
4—Call origination
5—Page response
6—No access
7—Power down registration
8—SMS page response.

Steps 606 and 614 of FIG. 6 access this field to determine the operation that the MS wants authorization to perform.

An MSCID 706 indicates the ID of the MSC/VLR forwarding the AUTHRQST message. Steps 604 and 612 access the MPCM file using this MSCID as a key to determine the system access types for which the particular MSC/VLR will allow an SSD update or a unique challenge to be performed.

FIGS. 8(*a*) and 8(*b*) show parameters of a response to an Authentication Request (AUTHRQST) message of FIG. 7.

This response is returned by the AC in response to an AUTHRQST message from an MSC/VLR and may include an SSD update and/or a unique challenge. When the AC issues an SSD update order in step 608 of FIG. 6, values are placed in RANDSSD field 804. When the AC issues a unique challenge order, values are placed in AUTHU field 802, RANDU field 804. In this way, the SSD update or unique challenge is passed to the MSC/VLR with the AC's response to the AUTHRQST message. This SSD will also be sent if it is to be shared.

FIGS. 9(a) and 9(b) show parameters of an Authentication Directive (AUTHDIR) message. FIG. 10 shows parameters of a response to an Authentication Directive (AUTHDIR) message.

In summary, the present invention allows an Authentication Center (AC) in a wireless communication system to store and retrieve transaction data on a per MIN/ESN basis. The data is stored in the subscriber's record in the subscriber database, using the MIN/ESN pair as a key.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method for storing event data in a wireless communication system, where a first Transaction Capabilities Application Part (TCAP) message has been processed and corresponding event data has been stored in a subrecord of a subscriber database, comprising the steps performed by an Authentication Center (AC), of:

processing a second TCAP message for a Mobile Identification Number/Electronic Serial Number (MIN/ESN) pair;

extracting a key from the second TCAP message, the key identifying the MIN/ESN pair; and storing event data of the TCAP message as a second subrecord of the subscriber database corresponding to the key, so that event data of multiple TCAP messages is stored in the subscriber database on a per MIN/ESN basis.

2. The method of claim 1, further including the step, performed by the AC, of:

processing a response to the second TCAP message; and storing the response to the second TCAP message in the second subrecord of the subscriber database corresponding to the key.

3. An apparatus that stores event data in a wireless communication system, where a first Transaction Capabilities Application Part (TCAP) message has been processed and corresponding event data has been stored in a subrecord of a subscriber database comprising:

a portion for processing a second TCAP message for a Mobile Identification Number/Electronic Serial Number (MIN/ESN) pair;

a portion configured for extracting a key from the second TCAP message, the key for identifying the MIN/ESN pair; and a portion configured for storing event data of the TCAP message as a second subrecord of the subscriber database corresponding to the key, so that event data of multiple TCAP messages is stored in the subscriber database on a per MIN/ESN basis.

4. The apparatus of claim 3, further comprising:

a portion configured for processing a response to the second TCAP message; and a portion configured for storing the response to the second TCAP message in the second subrecord of the subscriber database corresponding to the key.

5. A computer-readable medium having stored thereon instructions which, when executed by a processor and where a first Transaction Capabilities Application Part (TCAP) message has been processed and corresponding event data has been stored in a subrecord of a subscriber database, cause the processor to perform the steps of:

processing a second TCAP message for a Mobile Identification Number/Electronic Serial Number (MIN/ESN) pair;

extracting a key from the second TCAP message, the key identifying the MIN/ESN pair; and storing event data of the TCAP message as a second subrecord of the subscriber database corresponding to the key, so that event data of multiple TCAP messages is stored in the subscriber database on a per MIN/ESN basis.

6. The computer-readable medium of claim 5, further including the steps of:

processing a response to the second TCAP message; and storing the response to the second TCAP message in the second subrecord of the subscriber database corresponding to the key.

7. A method for storing event data in a wireless communication system, comprising the steps performed by a data processing system, of:

processing an event data transaction;

extracting a key from the event data transaction to a subscriber database, the key for storing and retrieving event data on a per key basis;

storing at least a part of the event data transaction as a subrecord of a subscriber database corresponding to the key wherein a subrecord for MIN/ESN pair in the subscriber database includes the following information: an MSCID of a TCAP Originator; a PCSSN of TCAP Originator; an invoke Timestamp; an Opcode of the Transaction; an MS COUNT/Call History Count; an Invoke Status Flag; an SSD shared Flag; an SSD Discarded Flag; an SSD Update Flag; an SSD Update Result Flag; a Unique Challenge Sent Flag; Unique Challenge Result Flag; an Access Denied flag; an Error Returned Flag; and storing at least a portion of a response of the transaction in a subrecord of the subscriber database corresponding to the key.

* * * * *